United States Patent
Prabhu et al.

(10) Patent No.: US 10,696,576 B2
(45) Date of Patent: Jun. 30, 2020

(54) BASALT PROCESSING VIA ELECTRIC INDUCTION HEATING AND MELTING

(71) Applicant: INDUCTOTHERM CORP., Rancocas, NJ (US)

(72) Inventors: Satyen N. Prabhu, Voorhees, NJ (US); Joseph T. Belsh, Mount Laurel, NJ (US); Aleksandr Olegovich Spiridonov, Allentown, NJ (US)

(73) Assignee: INDUCTOTHERM CORP., Rancocas, NJ (US)

( * ) Notice: Subject to any disclaimer, the term of this patent is extended or adjusted under 35 U.S.C. 154(b) by 491 days.

(21) Appl. No.: 15/218,050

(22) Filed: Jul. 24, 2016

(65) Prior Publication Data
US 2017/0022082 A1    Jan. 26, 2017

Related U.S. Application Data

(60) Provisional application No. 62/195,828, filed on Jul. 23, 2015.

(51) Int. Cl.
| | |
|---|---|
| *C03B 5/02* | (2006.01) |
| *C03B 5/24* | (2006.01) |
| *C03B 37/02* | (2006.01) |
| *F27B 14/06* | (2006.01) |
| *F27B 14/10* | (2006.01) |
| *C03B 5/20* | (2006.01) |
| *C03B 5/18* | (2006.01) |
| *C03B 5/44* | (2006.01) |

(52) U.S. Cl.
CPC .............. *C03B 5/021* (2013.01); *C03B 5/24* (2013.01); *C03B 37/02* (2013.01); *F27B 14/061* (2013.01); *F27B 14/10* (2013.01); *C03B 5/18* (2013.01); *C03B 5/20* (2013.01); *C03B 5/44* (2013.01); *F27B 2014/108* (2013.01)

(58) Field of Classification Search
None
See application file for complete search history.

(56) References Cited

U.S. PATENT DOCUMENTS

| | | | | |
|---|---|---|---|---|
| 3,572,671 | A * | 3/1971 | Worner | C21C 7/10 266/209 |
| 3,997,313 | A * | 12/1976 | Alexander | C03B 5/021 65/32.5 |
| 4,471,488 | A * | 9/1984 | Reboux | C03B 5/021 373/153 |
| 4,610,017 | A | 9/1986 | Perrier de la Bathie et al. | |
| 6,647,747 | B1 * | 11/2003 | Brik | B82Y 20/00 65/135.1 |
| 7,796,674 | B2 | 9/2010 | Keough | |

(Continued)

FOREIGN PATENT DOCUMENTS

| CN | 1513782 A | 7/2004 |
|---|---|---|
| EP | 0035850 A1 | 9/1981 |

*Primary Examiner* — Cynthia Szewczyk
(74) *Attorney, Agent, or Firm* — Philip O. Post

(57) ABSTRACT

An electric induction system and method is provided for induction heating and melting of basalt charge for the production of molten process basalt that can be used for molten basalt processes that produce basalt articles of manufacture including cast basalt articles and continuous basalt casting processes for producing basalt articles such as fibers and filaments.

7 Claims, 3 Drawing Sheets

(56) References Cited

U.S. PATENT DOCUMENTS

2004/0056026 A1* 3/2004 Jakes ................ C03B 5/023
                                                      219/701
2009/0129429 A1   5/2009 Fishman
2010/0288538 A1* 11/2010 Watkinson ........... C03B 37/005
                                                      174/254

* cited by examiner

BASALT PROCESSING VIA ELECTRIC INDUCTION HEATING AND MELTING

CROSS REFERENCE TO RELATED APPLICATIONS

This application claims priority to U.S. Provisional Application No. 62/195,828 filed Jul. 23, 2015, hereby incorporated by reference in its entirety.

FIELD OF THE INVENTION

The present invention relates to electric induction heating and melting of basalt to produce molten basalt for processes that produce basalt articles of manufacture including cast basalt articles and continuous basalt casting processes that can produce basalt articles such as fibers and filaments.

BACKGROUND OF THE INVENTION

Basalt is a hard, dense volcanic rock that has been used as a raw material in casting processes to make tiles and slabs. Cast basalt liners are also used for steel tubing since the liners exhibit very high abrasion resistance in industrial applications. In crushed form, basalt also finds use as aggregate in concrete.

Basalt is also used for fiber reinforcement of composites and other applications where a drawn basalt filament is used to produce other articles of manufacture. Quarried basalt rock is first crushed, then washed and loaded into a bin attached to feeders that move the material into melting baths in gas-heated furnaces. As crushed basalt enters the gas-heated furnace, the material is liquefied at a temperature of approximately 1,500° C. The opaque basalt absorbs infrared energy and therefore it is more difficult for gas burners used in conventional furnaces to uniformly heat the entire basalt mix. Consequently the melting basalt must be held in the furnace for extended periods of time to ensure a homogenous temperature. Attempts to promote uniform basalt heating include immersion of electrodes in the bath. However there is a preference for gas heating despite increased manufacturing costs. An alternative two-stage gas heating scheme features separate zones equipped with independently controlled heating systems where only the temperature control system in the gas furnace outlet zone that feeds basalt filament extrusion bushings requires precision temperature control, so a less sophisticated temperature control system may be used in the initial gas heating zone. The extruded basalt filaments can then be further processed, for example, into fibers, fabrics or other articles of manufacture.

It is one object of the present invention to provide alternative apparatus and method for heating and melting of basalt to produce molten process basalt for basalt articles of manufacture.

It is another object of the present invention to provide alternative apparatus and method for heating and melting of basalt to produce molten process basalt for continuous casting of basalt articles of manufacture.

It is another object of the present invention to provide alternative apparatus and method for heating and melting of basalt for the continuous casting of basalt fiber or filament.

SUMMARY OF THE INVENTION

The present invention is apparatus and method for electric induction melting and heating of a basalt charge for the production of molten process basalt for use in processes that produce basalt articles of manufacture. In some embodiments of the invention the basalt processes are continuous casting of basalt articles of manufacture that include basalt fiber or filament.

The above and other aspects of the invention are set forth in this specification and the appended claims.

BRIEF DESCRIPTION OF THE DRAWINGS

The appended drawings, as briefly summarized below, are provided for exemplary understanding of the invention, and do not limit the invention as further set forth in this specification.

DETAILED DESCRIPTION OF THE INVENTION

Figure 1:
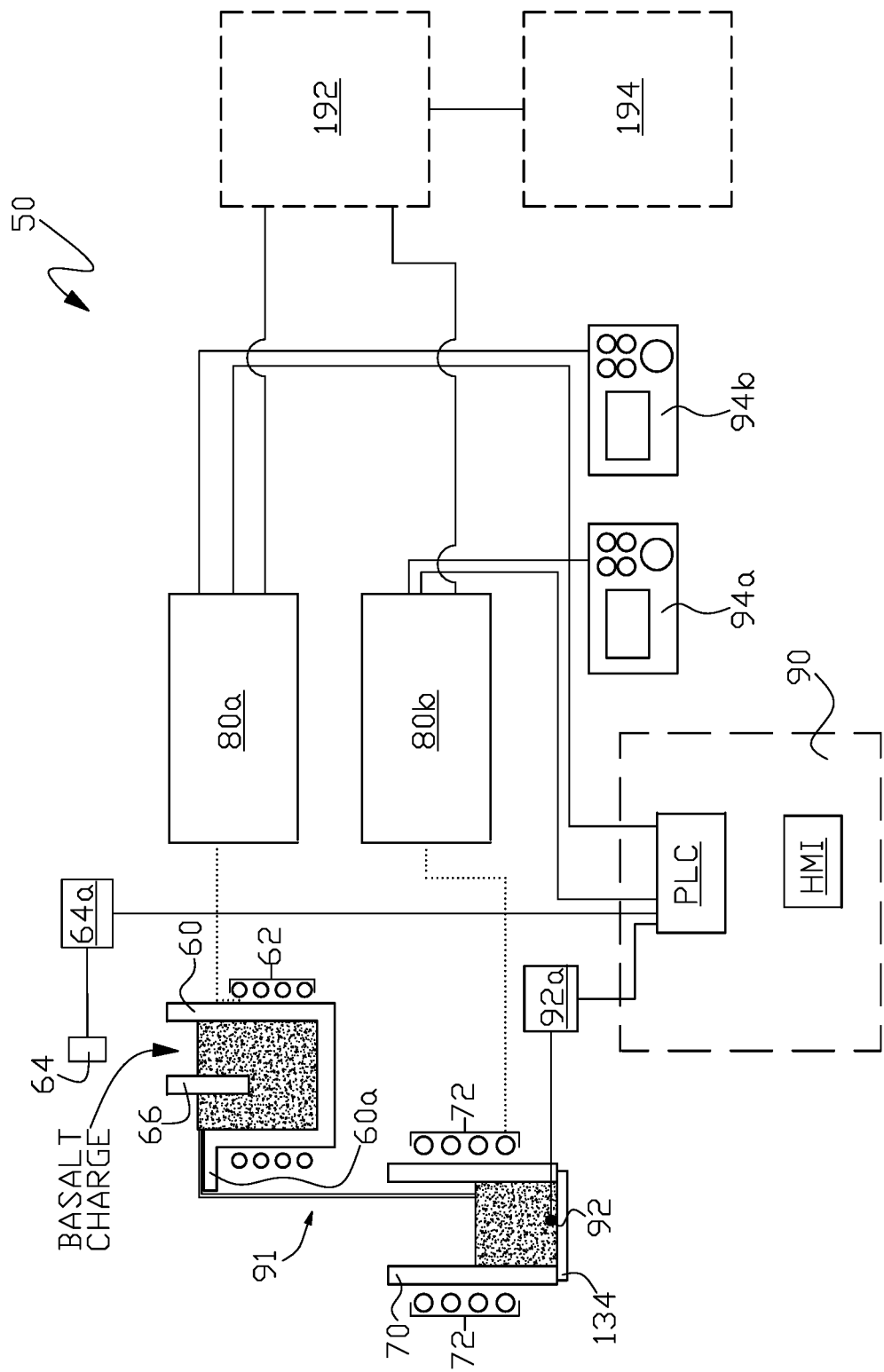
FIG. 1 illustrates one example of an electric induction system and process for melting and heating basalt charge to form molten process basalt that is used for producing basalt articles of manufacture.

FIG. 1 illustrates one example of an electric induction system 50 for melting and heating basalt charge for the production of molten process basalt for use in processes that produce basalt articles of manufacture including continuously cast basalt articles of manufacture.

In one embodiment of the invention high temperature molten basalt induction furnace 60 and molten process basalt induction furnace 70 are both cold crucible electric induction furnaces. In embodiments where basalt articles of manufacture, such as fiber or filaments, furnace 70 is also referred to as a caster (or casting) furnace.

Basalt charge is supplied as a raw material to high temperature cold crucible induction furnace 60 via a suitable cold crucible induction furnace charging system that transfers the basalt charge from a raw material feed area to furnace 60 where it is inductively heated by supplying alternating current (AC) electric power to one or more induction coils 62 surrounding the exterior height of the high temperature cold crucible induction furnace from a suitable AC source that in one embodiment of the invention is in the approximate range of 600 kW and 300 kHz to 800 kHz.

Cold crucible induction furnace 60 can melt an initial batch of solid basalt charge to establish a molten basalt batch in the furnace to which solid basalt charge can be continuously added for a continuous basalt casting process. Auxiliary removable heating means such as one or more susceptors or plasma torches may be used to assist in the melting of the initial batch of solid basalt charge. Alternatively the process may be started by supplying an initial batch of molten basalt to furnace 60.

Once a batch (shown stippled in FIG. 1 as a substantially full furnace) of molten basalt is established in high temperature cold crucible induction furnace 60 the furnace maintains the high temperature of the heated molten basalt batch in the approximate range of 1500° C. to 2000° C. as required for the particular molten process basalt application in one embodiment of the invention. The term "high temperature" as used herein refers to the heated molten basalt temperature to be maintained in the high temperature cold crucible induction furnace before the heated molten basalt is transferred to molten process basalt cold crucible induction furnace 70. The heated molten basalt temperature is typically higher than the "molten process basalt temperature" in the molten process basalt cold crucible induction furnace.

A temperature measurement device 64 such as a non-contact pyrometer monitors the temperature at the surface of the molten basalt batch in furnace 60 where heated molten basalt gravity flows out of high temperature cold crucible induction furnace 60 via furnace pour lip assembly 60a into molten process basalt cold crucible induction furnace 70 as illustrated by heated molten basalt stream 91 between furnaces 60 and 70.

A continuous gravity pour of heated molten basalt is maintained in one embodiment of the invention in an approximate range of 1500° C. to 1800° C. via variable control of AC electric power supplied to one or more induction coils 62 from AC power supply 80a and the time rate of basalt charge added to the molten basalt batch in high temperature cold crucible induction furnace 60.

In an alternative embodiment of the invention high temperature cold crucible induction furnace 60 may be a tilting furnace so that the gravity flow rate of heated molten basalt from the high temperature cold crucible induction furnace can also be controlled via a controllable tilt angle of furnace 60 from horizontal.

In some embodiments of the invention underflow baffle 66 is provided in high temperature cold crucible induction furnace 60 to separate the basalt surface region of the basalt charge receiving section of the furnace as indicated in FIG. 1 from the pouring region of the furnace to allow only completely molten basalt to be poured from furnace 60. In other embodiments of the invention strainer means may be provided in furnace 60 in place of, or in addition to the underflow baffle, to perform a similar function as the underflow baffle.

Heated molten basalt that is gravity poured from high temperature cold crucible induction furnace 60 to molten process basalt cold crucible induction furnace 70 is inductively heated via one or more induction coils 72 surrounding the exterior height of molten process basalt cold crucible induction furnace 70 by supplying AC electric power to one or more induction coils 72 from a suitable AC source that in one embodiment of the invention is in the approximate range of 150 kW to 300 kW and 300 kHz to 800 kHz. Molten process basalt in molten process basalt cold crucible induction furnace 70 is maintained in one embodiment of the invention in the approximate range of 1400° C. to 1500° C. by varying the supply of power from AC power supply 80b to one or more induction coils 72. The "molten process basalt temperature" of the molten process basalt in molten process basalt cold crucible induction furnace 70 is distinguished from the "heated molten basalt high temperature" of the heated molten basalt in high temperature cold crucible induction furnace 60 in that the molten process basalt temperature is in a temperature range as required for a particular molten process basalt application whereas the heated molten basalt high temperature in furnace 60 is based on a required heated molten basalt production rate from the basalt charge to support the supply of heated molten basalt to the molten process basalt cold crucible induction furnace.

In one embodiment of the invention where the molten process basalt application is continuous casting, the continuous casting process temperature of the heated molten basalt is maintained at 1800° C. in high temperature cold crucible induction furnace 60 and 1400° C. in molten process basalt cold crucible induction furnace 70.

Electromagnetic stirring is used in some embodiments of the invention to maintain a homogenous molten basalt batch temperature in either or both of the cold crucible induction furnaces 60 and 70 with one or more induction coils to achieve a desired stir pattern.

In one embodiment of the invention where molten process basalt cold crucible induction furnace 70 is used in a molten basalt casting application for the casting of basalt filament or basalt fiber, casting plenum 134 is provided at the bottom of molten process basalt cold crucible induction furnace 70. Casting plenum 134 typically comprises a platinum alloy bushing with a plurality of die holes that molten basalt at the molten process basalt temperature passes through via gravity and hydrostatic pressure of the molten basalt in cold crucible induction furnace 70 to continuously exit cold crucible furnace 70 as a basalt filament or basalt fiber through each of the die holes.

In some molten basalt casting applications of the present invention a molten process basalt temperature measurement and feedback control system is provided. In one embodiment of the invention the measurement and control system comprises a molten basalt temperature measurement device such as thermocouple 92 disposed near the bottom bushing in the molten process basalt in cold crucible induction furnace 70 that outputs a temperature signal that is transmitted to programmable logic controller (PLC) in process controller 90 via signal conditioner 92a. The output of the temperature signal from temperature measurement device 64 is also transmitted to the programmable logic controller via signal conditioner 64a. The process controller interfaces with a human-machine interface console (HMI) for human operator monitoring and control of the system and the process.

In other embodiments of the invention for molten process basalt applications, molten process basalt cold crucible induction furnace 70 is modified for the appropriate process to support the appropriate molten process basalt temperature. For example in some embodiments of the invention cold crucible induction furnace 70 is modified for bottom pour through a bottom nozzle assembly, tilt pour with a closed furnace bottom, or other molten process basalt pour methods from furnace 70 into molds that produce basalt articles of manufacture. In other embodiments of the invention furnace 70 is modified for bottom release of molten process basalt in forms other than filament or fiber that may, for example, produce basalt ingots through an open bottom cold crucible with ingot cooling apparatus or solid processed basalt particulate.

In some embodiments of the invention auxiliary process monitoring and control stations 94a and 94b can be provided at strategic locations in the electric induction system processing areas.

Auxiliary systems such as water cooling system 192 powered by motor control center 194 can be provided as required for closed water cooling systems as required by process equipment in a particular application.

Figure 2:
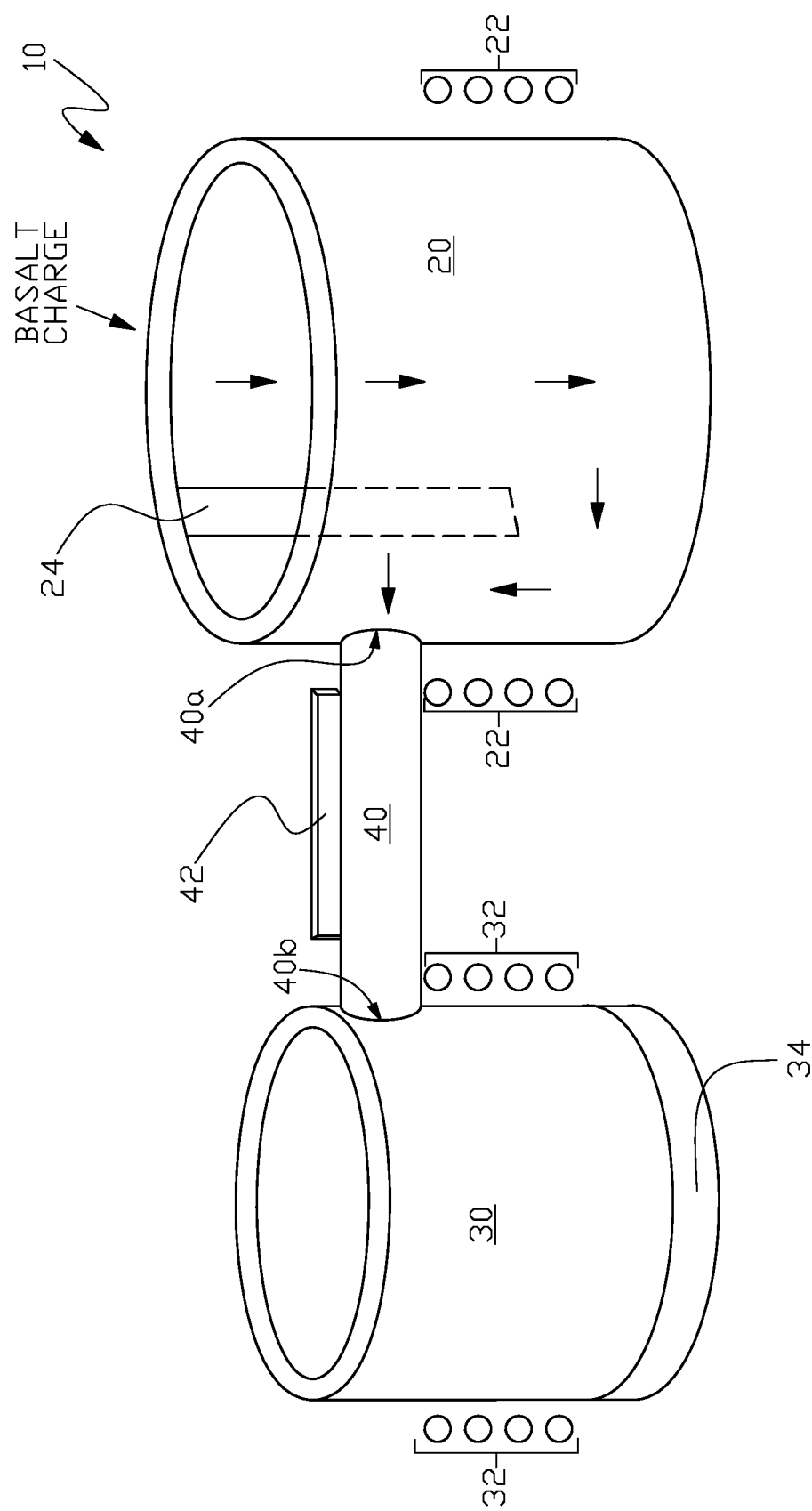
FIG. 2 illustrates another example of an electric induction system and process for melting and heating basalt charge to form molten process basalt that is used for producing basalt articles of manufacture.

FIG. 2 illustrates another example of an electric induction system 10 for melting and heating basalt charge for the production of molten process basalt for use in processes that produce basalt articles of manufacture including continuously cast basalt articles of manufacture.

In one embodiment of the invention high temperature molten basalt induction furnace 20 and molten process basalt induction furnace 30 are both cold crucible electric induction furnaces. In embodiments where basalt articles of manufacture, such as fibers or filaments, furnace 30 can also referred to as a molten process basalt holding and caster (or casting) furnace.

The interiors of furnaces 20 and 30 are interconnected via enclosed cold crucible launder 40. The cold crucible launder is formed similar to a cold crucible induction furnace with metal segmented wall sections horizontally oriented but without an induction coil wound around its outer length. As with a cold crucible induction furnace the segmented wall sections have interior passages for flow of a fluid cooling medium.

Basalt charge is supplied as a raw material to high temperature cold crucible induction furnace 20 via a suitable cold crucible induction furnace charging system that transfers the basalt charge from a raw material feed area to furnace 20 where it is inductively heated by supplying AC electric power to one or more induction coils 22 surrounding the exterior height of the high temperature cold crucible induction furnace from a suitable AC source that in one embodiment of the invention is in the approximate range of 600 kW and 300 kHz to 800 kHz.

Cold crucible induction furnace 20 can melt an initial batch of solid basalt charge to establish a molten basalt batch in the furnace to which solid basalt charge can be continuously added and mixed for a continuous basalt casting process. Auxiliary removable heating means such as one or more susceptors or plasma torches may be used to assist in the melting of the initial batch of solid basalt charge. Alternatively the process may be started by supplying an initial batch of molten basalt to furnace 20.

Once a batch of molten basalt is established in high temperature cold crucible furnace 20 the furnace maintains the high temperature of the heated molten basalt batch in the approximate range of 1500° C. to 2000° C. as required for the particular molten process basalt application in one embodiment of the invention. The term "high temperature" as used herein refers to the heated molten basalt temperature to be maintained in the high temperature cold crucible induction furnace before the heated molten basalt is transferred to molten process basalt cold crucible induction furnace 30.

In one embodiment of the invention where molten process basalt application is continuous casting, once the height of the heated molten basalt batch in cold crucible induction furnace 20 reaches enclosed launder inlet opening 40a heated molten basalt transfers from high temperature cold crucible induction furnace 20 to the molten process basalt cold crucible induction furnace 30 where the molten basalt is inductively heated via one or more induction coils 32 surrounding the exterior height of furnace 30 by supplying AC electric power to the one or more induction coils 32 from a suitable AC source that in one embodiment of the invention is in the approximate range of 150 kW to 300 kW and 300 kHz to 800 kHz. The continuous casting process temperature of the molten basalt is maintained at approximately 1500° C. to 2000° C. for the heated molten basalt in high temperature cold crucible induction furnace 20 and approximately 1500° C. for the molten process basalt in molten process basalt cold crucible induction furnace 30. The "molten process basalt temperature" of the molten process basalt in molten process basalt cold crucible induction furnace 30 is distinguished from the "heated molten basalt high temperature" of the heated molten basalt in high temperature cold crucible induction furnace 20 in that the molten process basalt temperature is in a temperature range as required for a particular molten process basalt application whereas the heated molten basalt high temperature in furnace 20 is based on a required molten basalt production rate from the basalt charge to support the supply of heated molten basalt to the molten process basalt cold crucible induction furnace.

Electromagnetic stirring is used in some embodiments of the invention to maintain a homogenous molten basalt batch temperature in either or both of the cold crucible induction furnaces 20 and 30 with one or more induction coils to achieve a desired stir pattern.

In some embodiments of the invention a temperature chill control unit 42 is used to control the temperature of a fluid cooling medium, either liquid or gas, flowing through the interior passages of the segmented wall sections of cold crucible launder 40 so that heated molten basalt entering molten process basalt cold crucible induction furnace 30 at enclosed launder outlet opening 40b is at a sufficiently low temperature to maintain a continuous flow of heated molten basalt from high temperature cold crucible induction furnace 20 to molten process basalt cold crucible induction furnace 30 to support a continuous basalt casting process at the molten process basalt temperature.

In some embodiments of the invention optional underflow baffle 24 is provided in high temperature cold crucible induction furnace 20 to separate the basalt surface region of the basalt charge receiving section of the furnace as indicated in FIG. 2 from enclosed launder inlet opening 40a to allow only completely melted charge as heated molten basalt into the enclosed launder inlet opening via the heated molten basalt flow path under the baffle as indicated by the flow path arrows in FIG. 2. In other embodiments of the invention strainer means may be provided in furnace 20 in place of, or in addition to the baffle, to perform the same function.

In one embodiment of the invention where molten process basalt cold crucible induction furnace 30 is used in a molten basalt casting application for the casting of basalt filament or basalt fiber, casting plenum 34 is provided at the bottom of molten process basalt cold crucible induction furnace 30. Casting plenum 34 typically comprises a platinum alloy bushing with a plurality of die holes that the molten basalt at the molten process basalt temperature passes through via gravity feed and hydrostatic pressure of the molten basalt in furnace 30 to continuously exit furnace 30 as a basalt filament or fiber through each of the die holes.

The temperature monitoring and control systems for the embodiment of the invention illustrated in FIG. 1 also applies to the embodiment of the invention shown in FIG. 2 with appropriate modifications.

In other embodiments of the invention for molten process basalt applications, molten process basalt cold crucible induction furnace 30 is modified for the appropriate process to support the appropriate molten process basalt temperature. For example in some embodiments of the invention cold crucible induction furnace 30 is modified for bottom pour through a bottom nozzle assembly, tilt pour with a closed furnace bottom, or other molten process basalt pour method from furnace 30 into molds that produce basalt articles of manufacture. In other embodiments of the invention furnace 30 is modified for bottom release of molten process basalt in forms other than filament or fiber that may, for example, produce basalt ingots through an open bottom cold crucible with ingot cooling apparatus or solid processed basalt particulate.

The above embodiments of the invention comprise two separate cold crucible induction furnace which is advantageous in that the heated molten basalt temperature in the high temperature cold crucible induction furnace and the molten process basalt temperature in the molten process basalt cold crucible induction furnace can be maintained with separate temperature control systems and basalt charge impurities can be processed in the high temperature cold crucible induction furnace before reaching the molten process basalt cold crucible induction furnace.

Figures 3A, 3B:
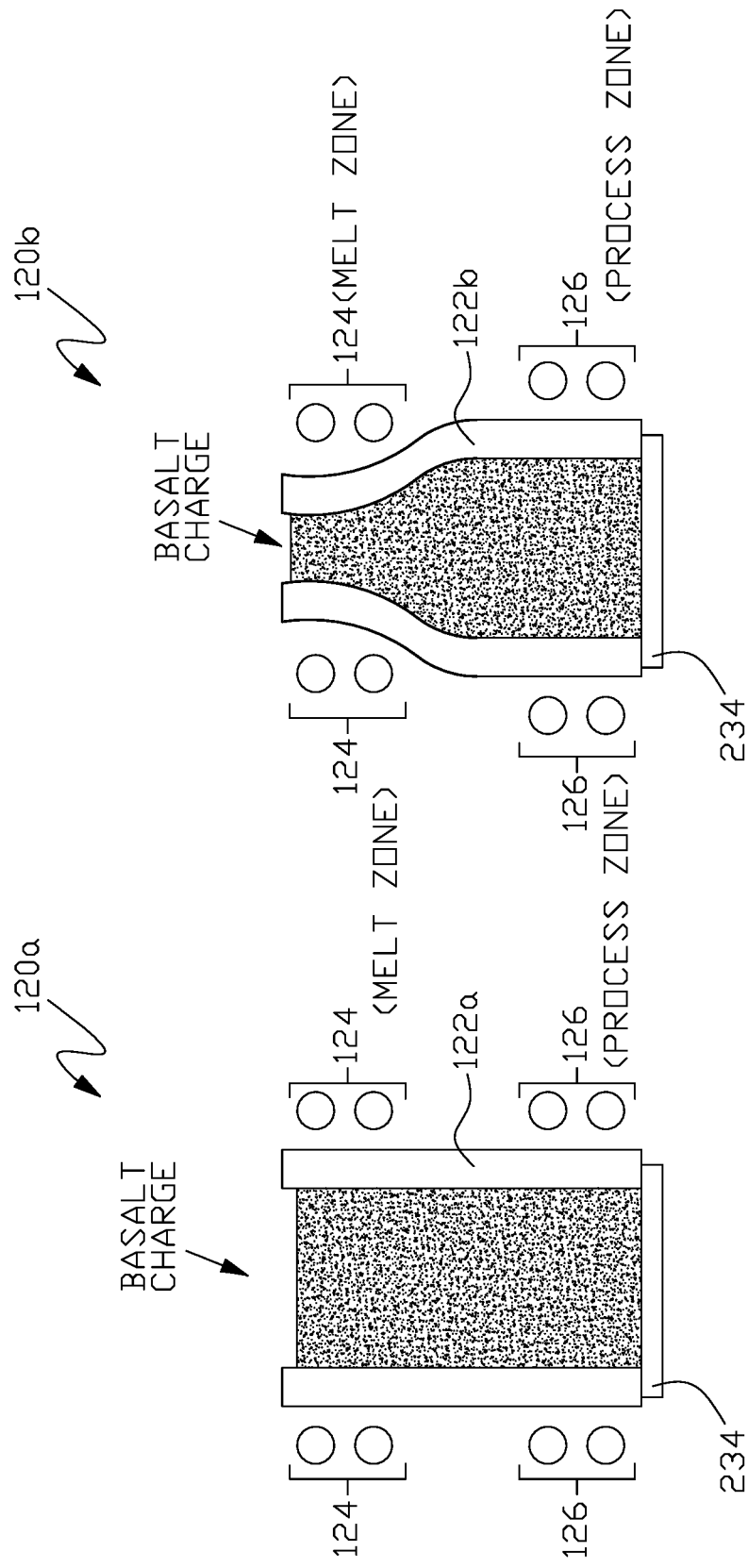
FIG. 3(a) and FIG. 3(b) illustrate another example of an electric induction system and process for melting and heating basalt charge to form molten process basalt that is used for producing basalt articles of manufacture.

FIG. 3(a) and FIG. 3(b) illustrate another example of an electric induction system 120a or 120b for melting and heating basalt charge for the production of molten process basalt for use in processes that produce basalt articles of manufacture where a single cold crucible electric induction furnace is used for both high temperature melting of basalt charge and maintaining molten process basalt at a molten process basalt temperature.

Electric induction system 120a or 120b utilizes a single cold crucible induction furnace 122a or 122b in FIG. 3(a) or FIG. 3(b) respectively to achieve a high temperature molten basalt at a heated molten basalt temperature in upper furnace section (melt zone) where basalt charge supplied to the single furnace is melted and maintained at a heated molten basalt temperature and process molten basalt at molten basalt process temperature is maintained in lower furnace section (process zone). Utilization of a single cold crucible induction furnace reduces exposed surface area of the molten basalt which reduces process thermal losses and results in lower electric power input.

One or more high temperature upper induction coils 124 inductively melt and heat basalt in the melt zone to a required heated molten basalt temperature via variable control of AC electric power supplied to one or more induction coils 124 from an AC power supply.

One or more molten process basalt lower induction coils 126 inductively heat basalt in the process zone to a required molten process basalt temperature via variable control of AC electric power supplied to one or more induction coils 126 from an AC power supply.

The embodiment shown in FIG. 3(b) with the upper melt zone interior horizontal cross sectional area of the furnace being small than the lower process zone interior cross sectional area of the furnace is advantageous in achieving molten basalt temperature gradients between the melt zone and process zone with the transitional throat region between the smaller and larger cross sectional areas aiding in electromagnetic stirring effects of the upper induction coil(s) and lower induction coil(s) to keep the high temperature heated molten basalt above the lower temperature molten process basalt.

Additional electromagnetic stirring can be used in some embodiments of the invention to achieve temperature gradients between the melt zone and process zone with one or more induction coils 124 and/or 126 to achieve a desired stir pattern.

In one embodiment of the invention where single cold crucible induction furnace 122a or 122b is used in a molten basalt casting application for the casting of basalt filament or basalt fiber, casting plenum 234 is provided at the bottom of the furnace. Casting plenum 234 typically comprises a platinum alloy bushing with a plurality of die holes that the molten basalt at the molten process basalt temperature passes through via gravity feed and hydrostatic pressure of the molten basalt in the furnace to continuously exit the furnace as a basalt filament or fiber through each of the die holes.

In other embodiments of the invention for molten process basalt applications single cold crucible induction furnace 122a or 122b is modified for the appropriate process to support the appropriate molten process basalt temperature. For example in some embodiments of the invention the furnace is modified for bottom pour into molds that produce basalt articles of manufacture. In other embodiments of the invention the furnace is modified for bottom release of molten process basalt in forms other than filament or fiber that may, for example, produce basalt ingots or solid processed basalt particulate.

In the above examples of the invention cold crucible induction furnaces and launder are utilized. In other embodiments of the invention an electric induction furnace with refractory crucible may be used in place of one or more of the cold crucible induction furnaces or launder with appropriate features to accommodate basalt. For example lining of the interior of the refractory crucible with a liner composition that avoids contamination of the molten basalt with refractory material.

In the description above, for the purposes of explanation, numerous specific requirements and several specific details have been set forth in order to provide a thorough understanding of the example and embodiments. It will be apparent however, to one skilled in the art, that one or more other examples or embodiments may be practiced without some of these specific details. The particular embodiments described are not provided to limit the invention but to illustrate it.

Reference throughout this specification to "one example or embodiment," "an example or embodiment," "one or more examples or embodiments," or "different example or embodiments," for example, means that a particular feature may be included in the practice of the invention. In the description various features are sometimes grouped together in a single example, embodiment, figure, or description thereof for the purpose of streamlining the disclosure and aiding in the understanding of various inventive aspects.

The present invention has been described in terms of preferred examples and embodiments. Equivalents, alternatives and modifications, aside from those expressly stated, are possible and within the scope of the invention.

The invention claimed is:

1. A method of melting and heating a basalt charge with electric induction to supply a molten process at a molten process basalt temperature for a basalt article manufacturing process, the method comprising:
    inductively heating the basalt charge in a high temperature cold crucible induction furnace via a first alternating current power supplied at 600 kW and a high temperature frequency in a range of 300 kHz to 600 kHz to a high temperature induction coil surrounding an exterior height of the high temperature cold crucible induction furnace to form a heated molten basalt batch in a temperature range of 1500° C. to 2000° C. in the high temperature cold crucible induction furnace;
    continuously gravity flowing the heated molten basalt batch from the high temperature cold crucible induction furnace to a molten process basalt cold crucible induction furnace while controlling a time rate of adding the basalt charge to the high temperature cold crucible induction furnace and the first alternating current power; and
    inductively heating the heated molten basalt batch in the molten process basalt cold crucible induction furnace via a second alternating current power supplied in a range of 150 kW to 300 kW at a molten process basalt frequency in a range of 300 kHz to 800 kHz to a molten process basalt induction coil surrounding an exterior height of the molten process basalt cold crucible induction furnace to form a molten process basalt in a temperature range of 1400° C. to 1500° C. in the molten process basalt cold crucible induction furnace.

2. The method of claim 1 further comprising casting the molten process basalt through a casting plenum at a bottom of the molten process basalt cold crucible induction furnace to form a basalt filament or a basalt fiber.

3. The method of claim 1 further comprising electromagnetically stirring the heated molten basalt batch or the molten process basalt.

4. A method of melting and heating a basalt charge with electric induction to supply a molten process at a molten process basalt temperature for a basalt article manufacturing process, the method comprising:

inductively heating the basalt charge in a high temperature cold crucible induction furnace via a first alternating current power supplied at 600 kW and a high temperature frequency in a range of 300 kHz to 600 kHz to a high temperature induction coil surrounding an exterior height of the high temperature cold crucible induction furnace to form a heated molten basalt batch in a temperature range of 1500° C. to 2000° C. in the high temperature cold crucible induction furnace;

continuously supplying the heated molten basalt batch from the high temperature cold crucible induction furnace to a molten process basalt cold crucible induction furnace via an enclosed cold crucible launder having an interior launder passage connecting an interiors of the high temperature cold crucible induction furnace and the molten process basalt cold crucible induction furnace; and inductively heating the heated molten basalt batch in the molten process basalt cold crucible induction furnace via a second alternating current power supplied in the range of 150 kW to 300 kW at a molten process basalt frequency in a range of 300 kHz to 800 kHz to a molten process basalt induction coil surrounding an exterior height of the molten process basalt cold crucible induction furnace to form a molten process basalt in the range of 1500° C. to 2000° C. in the molten process basalt cold crucible induction furnace.

5. The method of claim 4 further comprising controlling a launder temperature of the heated molten basalt batch in the enclosed cold crucible launder by flowing a fluid cooling medium through an interior passage in each of a plurality of segmented wall sections of the enclosed cold crucible launder.

6. The method of claim 4 further comprising casting the molten process basalt through a casting plenum at a bottom of the molten process basalt cold crucible induction furnace to form a basalt filament or a basalt fiber.

7. The method of claim 4 further comprising electromagnetically stirring the heated molten basalt batch or the molten process basalt.

\* \* \* \* \*